(No Model.)
C. B. HALSTEAD & J. A. CARPENTER.
LOG SAWING MACHINE.
No. 251,872.  Patented Jan. 3, 1882.
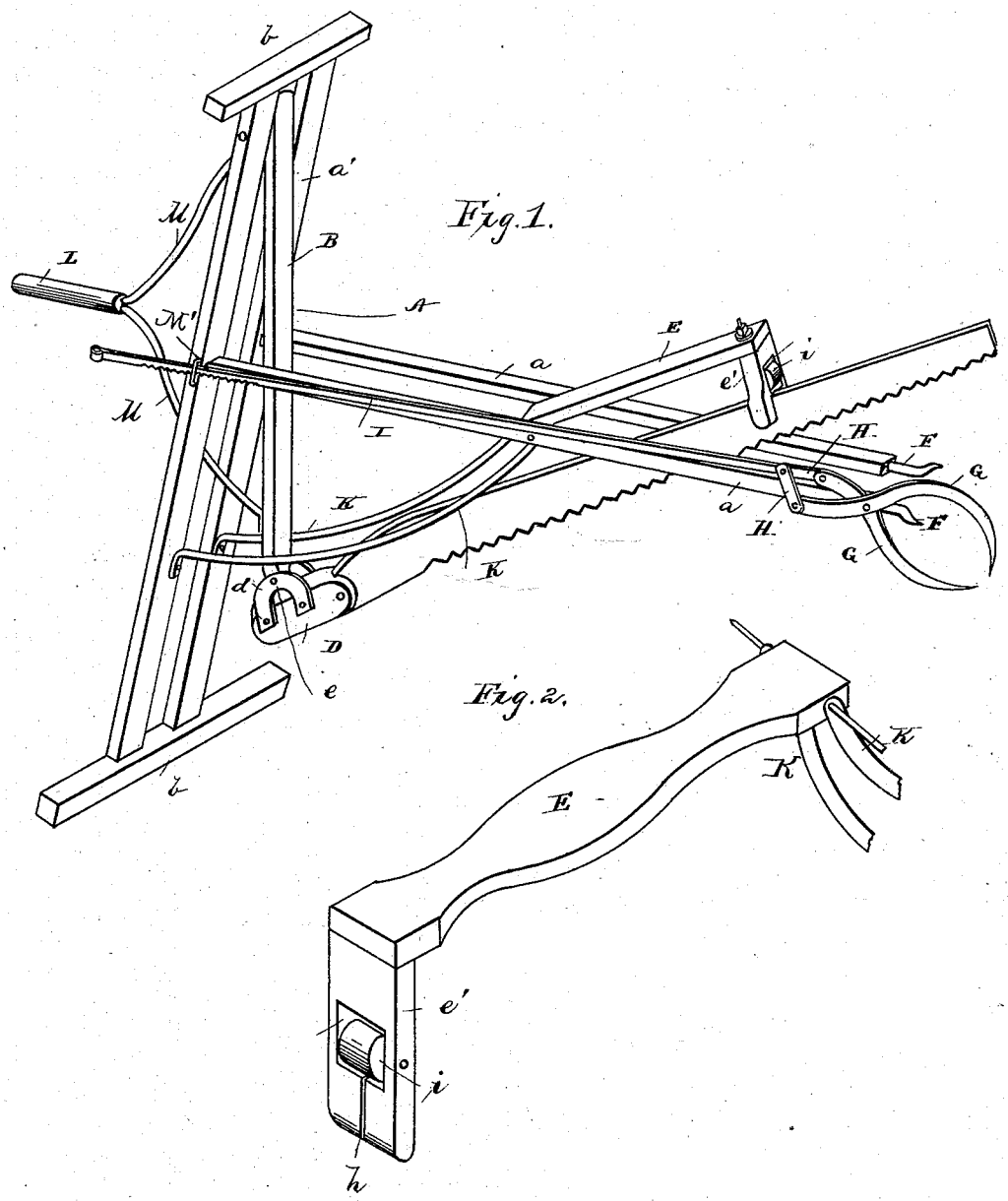
Witnesses,
Edwin L. Yewell.
J. J. McCarthy.
Inventor,
Clark B. Halstead,
James A. Carpenter,
per O. M. Alexander.
Attorney.

UNITED STATES PATENT OFFICE.

CLARK B. HALSTEAD AND JAMES A. CARPENTER, OF MARION, OHIO.

LOG-SAWING MACHINE.

SPECIFICATION forming part of Letters Patent No. 251,872, dated January 3, 1882.

Application filed September 28, 1881. (No model.)

*To all whom it may concern:*

Be it known that we, CLARK B. HALSTEAD and JAMES A. CARPENTER, of Marion, in the county of Marion, and in the State of Ohio, have invented certain new and useful Improvements in Log-Sawing Machines; and we do hereby declare that the following is a full, clear, and exact description thereof, reference being had to the accompanying drawings, and to the letters of reference marked thereon, making a part of this specification.

This invention relates to certain improvements in log-saws; and it has for its object to provide an apparatus which may be cheaply constructed, which will be durable and not liable to get out of order, and which may be readily and conveniently operated by one person. These objects we attain by the apparatus illustrated in the accompanying drawings, in which—

Figure 1 represents a perspective view of the apparatus entire, and Fig. 2 a detached view of the guide for guiding the free end of the saw.

The letter A indicates the frame of the machine, and is composed of the inclined beams $a$ $a'$. Between the upper parts of the beams $a'$, which are connected at the top and bottom by means of the cross-pieces $b$, is journaled the upper end of a swinging bar or sweep, B, which is adapted to swing between the beams $a$. To the lower end of the said bar B is pivoted a head, D, by means of the segmental connections $d$ and the pivot-pin $e$.

The letter E indicates a loosely-connected bar, which is located between the beams $a$ and extends toward the front ends of the same. The front end of the bar is provided with a hanger, $e'$, which has a vertical slot, $h$, and friction-wheel $i$ near its lower end, to guide the free end of the saw. The rear end of the saw is secured to the pivoted head D, so as to be moved back and forth by the oscillation of the bar B.

The letter F indicates two prongs at the front of the beams $a$, which are inserted in the log to be cut, and serve to hold the forward ends of the beams securely in place.

G indicates a pair of tongs or bent levers fulcrumed to the forward end of one of the beams $a$ at one side, and connected by links H to a bar or rod, I, extending backward to the operator, the said bar having serrations or teeth adapted to engage a staple, M', driven into one of the beams $a$, by which the tongs G are made to clamp and secure the machine to the log. These levers or tongs serve to clamp the apparatus to the log, and act in conjunction with the prongs to hold the forward end of the apparatus to its work.

The letter K indicates two curved braces for strengthening the apparatus. L indicates a handle attached to the rods M, which are secured to the sweep B.

The operation of the above invention will be readily understood from the above description. The forward end of the apparatus is secured to the log, as set forth, the rear end resting upon the ground. The saw is then adjusted in its guide, and by means of the handle and swinging beam B is traversed back and forth over the log.

The apparatus may be arranged to suit the size of the operator by changing the height of the handle, so that it can be used by a grown person or child, which is done by changing the respective lengths of the pieces M M which form the handle, making their point of union higher or lower, as the case may be.

Having thus described our invention, what we claim, and desire to secure by Letters Patent, is—

In combination with the supporting-frame, constructed as described, and provided with prongs to enter the log, the oscillating sweep, carrying a saw working through a suitable slot in a hanger secured to a bar loosely connected to the supporting-frame and against a friction-roller mounted in an opening in said hanger, and the tongs and their operating mechanism, adapted to work in connection with the prongs on the frame to hold the log, substantially as specified.

In testimony whereof we affix our signatures, in presence of two witnesses, this 21st day of September, 1881.

CLARK B. HALSTEAD.
JAMES A. CARPENTER.

Witnesses:
CLAUDE DRAKE,
J. JOE McCARTHY.